Nov. 13, 1956  P. J. PAQUIN  2,770,362
FUEL TANK SEDIMENT TRAP
Filed June 25, 1954

Patrick J. Paquin
INVENTOR.

BY *Clarence A. O'Brien*
*and Harvey B. Jacobson*
Attorneys

United States Patent Office

2,770,362
Patented Nov. 13, 1956

2,770,362

FUEL TANK SEDIMENT TRAP

Patrick J. Paquin, West Brookfield, Mass.

Application June 25, 1954, Serial No. 439,266

2 Claims. (Cl. 210—43)

This invention relates in general to improvements in accessories for fuel tanks, and more specifically to a fuel tank sediment trap.

Because of condensation in both storage tanks and fuel tanks, there often occurs water in a fuel tank of a motor vehicle. While the presence of water in a fuel tank of a motor vehicle will cause only irregular operation of the engine of such vehicle in the summertime, during the winter, the water has a tendency to freeze and clog the fuel line so that the vehicle will not run on a cold morning.

It is therefore the primary object of this invention to provide a fuel tank sediment trap which is so designed whereby elements heavier than gasoline, such as water, will be drawn from the fuel before it enters the fuel line of a vehicle.

Another object of this invention is to provide an improved fuel sediment trap which is so constructed whereby it may be attached to the bottom of existing gas tanks.

A further object of this invention is to provide an improved sediment trap for fuel tanks which is of a relatively simple construction and at the same time highly effective.

A still further object of this invention is to provide an improved fuel tank sediment trap which includes an auxiliary tank securable to the bottom of an existing fuel tank for receiving sediment, the auxiliary tank being provided with a suitable drain plug whereby sediment such as water, sand and other foreign matter may be conveniently removed periodically.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
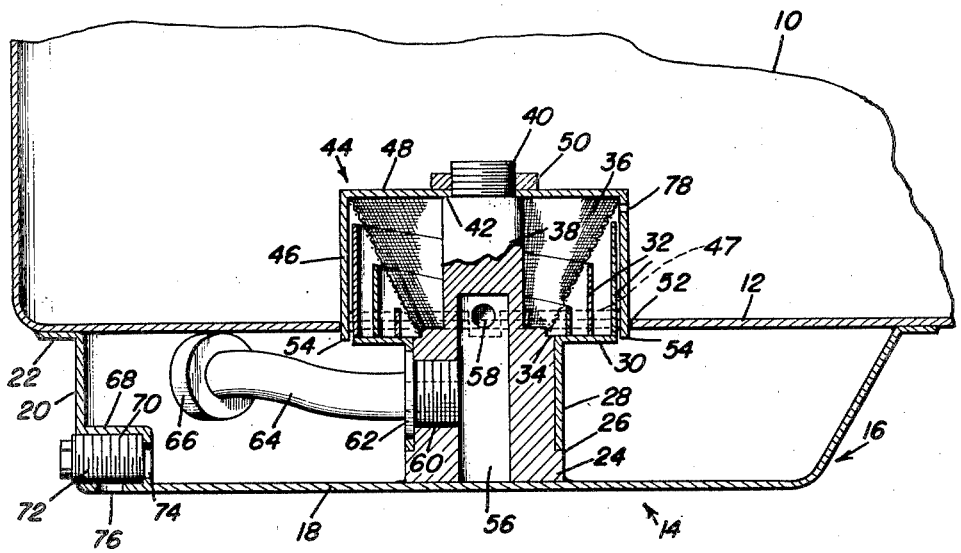
Figure 1 is a fragmentary vertical sectional view taken through the lower portion of a fuel tank provided with the fuel sediment trap which is the subject of this invention and shows the general details thereof.

Referring now to the drawings in detail, it will be seen that there is illustrated in Figure 1 a conventional fuel tank 10 which includes a bottom wall 12. Suitably secured to the bottom wall 12 is the fuel tank sediment trap which is the subject of this invention, the sediment trap being referred to in general by the reference numeral 14.

The sediment trap 14 includes an auxiliary tank which is referred to in general by the reference numeral 16. The tank 16 includes a bottom wall 18, side walls 20 and upper outwardly directed flanges 22. The flangs 22 are suitably secured to the bottom wall 12 of the fuel tank 10 by soldering or other similar processes.

Suitably secured to the upper surface of the bottom wall 18 is a fuel block 24. The fuel block 24 is provided with a lowermost shoulder 26 on which rests the lower end of a sleeve 28. The sleeve 28 has extending outwardly therefrom a pair of arms 30.

Figure 2:
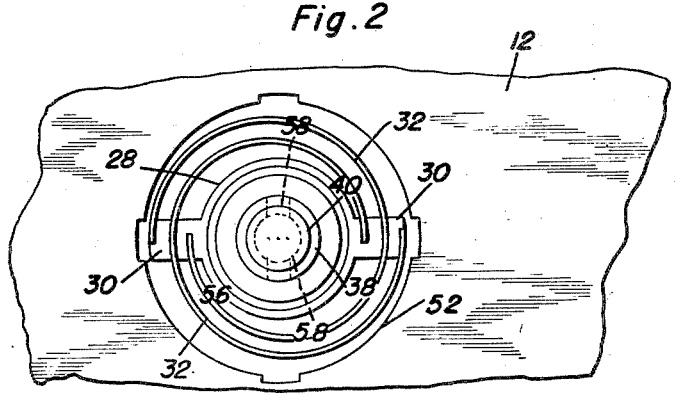
Figure 2 is a fragmentary top plan view of the sediment trap as viewed from the interior of a fuel tank to which it is attached, an upper shield thereof being omitted in order to clearly show the relationship of baffles of the sediment trap.

Referring now to Figure 2 in particular, it will be seen that secured to the arms 30 and overlying the same is a pair of spiral baffles 32. The baffles 32 are arranged in interested relation to produce the desired baffling effect.

Figure 3:
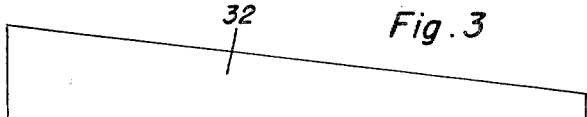
Figure 3 is a developed view of one of the baffles.

As best illustrated in Figure 1, the baffles 32 are of increasing height, with the upper edges of the two baffles 32 being in alignment along any radial point. Each of the baffles 32 is of increasing height throughout its length, as best illustrated in the developed view of one of the baffles 32 in Figure 3.

The fuel block 24 includes an intermediate shoulder 34 on which rests the lower end of a screen 36. The screen 36 is of an inverted frusto-conical outline and has substantially the same slope as the slope of a radial line drawn through the upper edges of the baffles 32. Thus, the screen 36 closely overlies the upper edges of the baffles 32.

The fuel block 24 also includes a reduced upper portion 38 which terminates in an externally threaded reduced upper part 40. The juncture between the upper portion 38 and the upper part 40 produces an uppermost shoulder 42. Seated on the uppermost shoulder 42 is an inverted cup-shaped shield 44. The shield 44 is of a diameter to be received over both the screen 36 and the baffles 32 and has a depending skirt portion 46 disposed closely adjacent the outermost portions of the baffles 32. The shield 44 also includes a base 48 which is received over the upper part 40. The base 48 is secured in place by a retaining nut 50 threadedly engaged on the upper part 40.

In order that the sediment trap 14 may be properly secured to the fuel tank 10, the bottom wall thereof is provided with an enlarged opening 52. The opening 52 has received therein depending legs 54 of the skirt portion 46. The legs 54 are circumferentially spaced and support the shield with the lower edge 47 of the skirt portion 46 above the bottom wall 12, as is best illustrated primarily by dotted lines in Figure 1.

The fuel block 24 is provided with a vertical fuel passage 56. The fuel passage 56 is provided in the upper part thereof with communicating horizontal inlet passages 58 which extend through the reduced portions 38 of the fuel block 24.

The lower portion of the fuel block 24 is also provided with an enlarged internally threaded bore 60 which communicates with the fuel passage 56. The bore 60 has removably received therein a suitable fitting 62 which connects a fuel line 64 to the fuel block 24. The opposite end of the fuel line 64 is provided with a fitting 66 which extends through one of the side walls 20 of the auxiliary tank 16 and receives a conventional fuel line of a vehicle which normally would be attached to the fuel tank 10.

In order that fuel may enter into the fuel passage 56 through the fuel inlet passages 58, it is necessary that the fuel must pass spirally around and upwardly between the baffles 32. After passing between the baffles 32, which due to the slow movement of the fuel permits any sediment carried by the fuel to drop into the auxiliary tank 16, the fuel must then pass through the screen 36 which would remove any fine foreign matter which might be suspended in the fuel. The fuel then passes from within the confines of the screen 36 into the fuel inlet passages 58.

In order that the auxiliary tank 16 may be periodically drained, there is provided a fitting 68 at the intersection of the side wall 20 and the bottom wall 18 at a point therealong. The fitting 68 includes a horizontal internally threaded bore 70 in which is positioned an externally threaded plug 72. The inner end of the fitting 68 is provided with an inlet bore 74. The bottom wall forming portion of the fitting 68 is provided with an outlet opening 76. Thus, it will be seen that by moving the plug 72 to a position out of alignment with the outlet opening 76, the auxiliary tank 16 may be drained.

From the foregoing description of the construction of the sediment trap, it will be seen that it may be conveniently and quickly attached to existing fuel tanks, as well as being adapted to new construction. Inasmuch as the auxiliary tank 16 is provided with its own fuel line fitting, it is preferred that in the case of fuel tanks having bottom fuel line fittings, the portion of the bottom wall of such tanks be removed to include such fittings. The construction of the sediment trap is such that not only water, but all foreign matter carried by fuel will be removed from the fuel prior to its entrance into a fuel line attached thereto. Thus, when a fuel tank of a vehicle is provided with a sediment trap which is the subject of this invention, it will be seen that the operation difficulties normally occurring with conventional fuel tanks will be eliminated. Inasmuch as the water carried by the fuel has no chance whatsoever of entering the fuel line attached to the auxiliary tank 16, it will be seen that there will be no possibility of a frozen fuel line in the wintertime.

In order to prevent an air lock within the sediment trap, it is highly advisable to provide an air vent opening. Such a vent opening may be formed in the skirt portion 46, as at 78.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modification and equivalents may be resorted to, falling within the scope of the appended claims.

What is claimed as new is as follows:

1. A fuel tank sediment trap comprising an auxiliary tank securable to the bottom of a fuel tank, a fuel block seated on the bottom of said auxiliary tank and adapted to project up into a fuel tank, said fuel block including an upper fuel inlet, a filter member carried by an upper portion of said fuel block, a shield around said filter member preventing direct downward flow of fuel into said fuel inlet, whereby fuel passing into said fuel inlet first passes upwardly through said filter member, baffles extending around said fuel block to ensure direct upward flow of fuel, said baffles being supported by said fuel block, said baffles being spirally disposed and of increasing height, said filter member being of an inverted conical outline and abutting upper edges of said baffles.

2. A fuel tank sediment trap comprising an auxiliary tank securable to the bottom of a fuel tank, a fuel block seated on the bottom of said auxiliary tank and adapted to project up into a fuel tank, said fuel block including an upper fuel inlet, a screen carried by an upper portion of said fuel block, a shield around said screen preventing direct downward flow of fuel into said fuel inlet, whereby fuel passing into said fuel inlet first passes upwardly through said screen, baffles extending around said fuel block to ensure direct upward flow of fuel, said baffles being supported by said fuel block, said baffles being spirally disposed and of increasing height, said screen being of an inverted conical outline and abutting upper edges of said baffles, said shield extending down and around said baffles.

References Cited in the file of this patent
UNITED STATES PATENTS

| | | |
|---|---|---|
| 1,113,683 | Pfahler | Oct. 13, 1914 |
| 1,291,599 | Mould | Jan. 14, 1919 |
| 1,394,011 | Hills | Oct. 18, 1921 |
| 1,632,511 | Sediva | June 14, 1927 |
| 1,720,380 | Schulze | July 19, 1929 |
| 1,855,904 | Brown et al. | Apr. 26, 1932 |
| 2,001,610 | Hildenbrand | May 14, 1935 |
| 2,205,336 | Beach | June 18, 1940 |
| 2,248,061 | Burch | July 8, 1941 |